United States Patent [19]

Barbero et al.

[11] 4,432,003

[45] Feb. 14, 1984

[54] INK-JET PRINTING DEVICE

[75] Inventors: Aquilino Barbero, Pavone Canavese; Mario Buat, Carema, both of Italy

[73] Assignee: Ing. C. Olivetti & C., S.p.A., Ivrea, Italy

[21] Appl. No.: 313,226

[22] Filed: Oct. 20, 1981

[30] Foreign Application Priority Data

Oct. 31, 1980 [IT] Italy ............................ 68664 A/80

[51] Int. Cl.[3] .......................................... G01D 15/16

[52] U.S. Cl. ................................ 346/140 R; 346/1.1

[58] Field of Search ................ 346/140 R, 1.1; 101/1

[56] References Cited

U.S. PATENT DOCUMENTS

| | | | |
|---|---|---|---|
| 2,143,376 | 1/1939 | Hansell | 346/140 X |
| 2,151,638 | 3/1939 | Genschmer | 346/140 |
| 3,052,213 | 9/1962 | Schaffert | 118/647 |
| 3,060,429 | 10/1962 | Winston | 346/75 |
| 3,177,800 | 4/1965 | Welsh | 346/140 X |
| 3,179,042 | 4/1965 | Naiman | 346/140 X |
| 3,640,214 | 2/1972 | Scheinhutte | 101/45 |
| 3,887,928 | 6/1975 | Ohno et al. | 346/140 |
| 4,021,818 | 5/1977 | Van Volten | 346/140 |
| 4,238,807 | 12/1980 | Bovio | 346/140 R |
| 4,263,601 | 4/1981 | Nishimura | 346/140 R X |
| 4,271,416 | 6/1981 | Shimizu | 346/140 R |
| 4,333,086 | 6/1982 | Ebi | 346/140 R |

*Primary Examiner*—Joseph W. Hartary
*Attorney, Agent, or Firm*—Schuyler, Banner, Birch, McKie & Beckett

[57] ABSTRACT

The device comprises an electrically insulating ink container containing one electrode and a counter-electrode disposed adjacent to the jet nozzle which is laser-bored through the container cover plate. The two electrodes are excited by a voltage pulse such as to generate a spark between the ink meniscus and the counter-electrode, and to expel a plurality of ink particles, rather than a single blob. The ink can be kept in circulation between the container and a reservoir 51 by means of a pump. The meniscus can be kept outside the nozzle by means of a second nozzle coaxial to the first, or by a suitable arrangement of the ink hydraulic circuit. In the case of magnetic ink, the meniscus is pulled back by a magnetic field. The ink can also be brought in front of the nozzle by capillarity.

45 Claims, 29 Drawing Figures

INK-JET PRINTING DEVICE

BACKGROUND OF THE INVENTION

This invention relates to an ink-jet printing device, in which printing is carried out by causing ink particles to be selectively emitted by a nozzle. Various types of selective ink-jet printers are known. In one known type of printer, the liquid ink droplets are generated by causing a selective increase in the nozzle pressure, for example by piezoelectric means. It has also been proposed to use a conductive liquid ink and to eject the ink particles electrostatically, by creating a very large voltage of several thousand volts between the ink and an electrode disposed in front of or behind the paper.

In both these types of printing device, the droplet generally assumes a spherical shape with a diameter of several microns, which becomes deposited on the paper.

Especially in the case of high definition printing, several droplets have to be generated which become partially superimposed on the paper, and it is therefore necessary to be able to dry the mark quickly. For this purpose it has been proposed to use porous paper because of which on the one hand the mark appears blurred, and on the other hand the advantage of being able to print on any paper is lost. It has also been proposed to dry the printed mark by heating or by a cold air jet, which makes the device complicated and costly. A further serious drawback of such printing devices derives from the fact that the liquid ink in the nozzle tends to dry and thus form incrustations. These not only make it difficult to commence printing after a certain period of inactivity, but even during apparently continuous printing they cause the droplets to assume dimensions which vary according to the inevitably variable time interval between one droplet and the next.

There is also known an ink jet printing device wherein the liquid ink is kept at a predetermined level in a small tube having its free end directed upwards. Inserted in the tube are two electrodes located on the same horizontal plane, whereby they remain submerged under an ink layer of a predetermined thickness. The ink jet is generated by an instantaneous vaporization of the portion of ink inside the tube located between the two electrodes, so as to expel the ink layer upwards.

Particularly, in a first embodiment of this printing device, the ink is electrically non-conductive and the vaporization is produced by the dielectric breakdown of the ink, thus producing a spark between the electrodes.

In another embodiment of the printing device, the ink is electrically conductive but has a rather high electric resistivity. The ink is contained in a reservoir, where it is preheated at a temperature slightly lower than the boiling point of the ink. By exciting the two electrodes with a voltage pulse, a current flows into the ink and therefore a great deal of heat is instantaneously produced, thus vaporizing a portion of ink between the electrodes and expelling the ink layer upwards.

Both embodiments of this printing device having two submerged electrodes have the disadvantages of requiring a tube of relatively large diameter in order to house the electrodes, whereby it is not possible to print small enough dots for a high definition printer.

SUMMARY OF THE INVENTION

The object of the present invention is to provide an ink-jet printer which produces indelible signs which are immediately dry and are formed of a uniform layer of ink.

According to the present invention, there is provided an ink-jet printing device in which printing is effected by inducing the selective emission from a nozzle of particules of electrically conductive liquid ink which is in electric contact with an electrode, and in which a counter-electrode in disposed adjacent to the nozzle between this latter and the print support, characterised by electrical means which can be selectively operated to excite tye electrode and counter-electrode by a voltage such as to generate, between the meniscus of the ink and the counter-electrode, an agitation condition such as to cause the expulsion of a plurality of ink particles through the nozzle.

It is apparent that the plurality of ink particles produces a more uniform distribution of ink on the paper so that the printed mark dries immediately, while remaining perfectly indelible. It is also apparent that the disruptive action of the spark on the meniscus is not influenced by any more or less dry or coagulated surface layers of the meniscus, so that the mark is always printed with the same ink intensity.

BRIEF DESCRIPTION OF THE DRAWINGS

The invention will be described in more detail, by way of example, with reference to the accompanying drawings, in which.

DESCRIPTION OF THE PREFERRED EMBODIMENT

Figure 1:
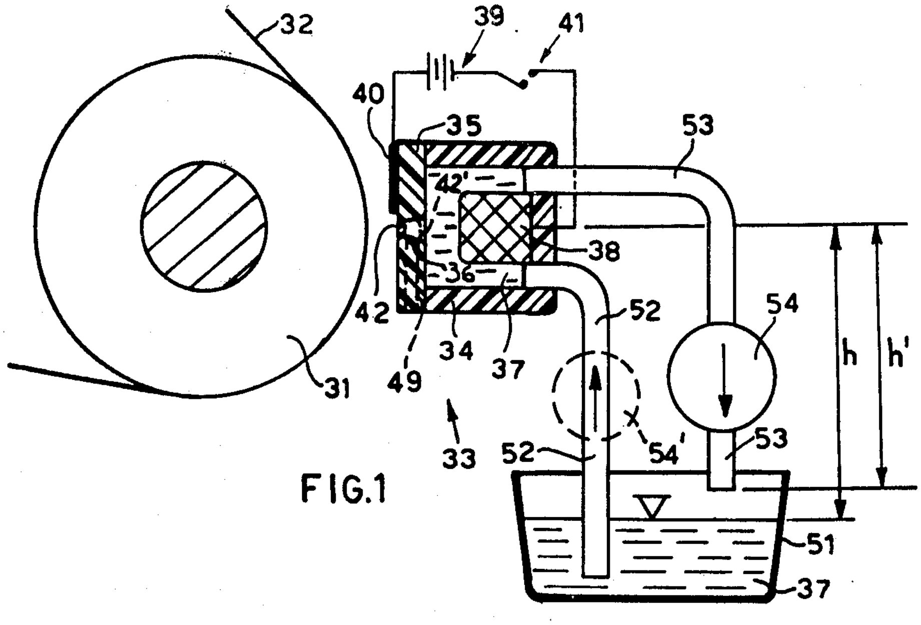
FIG. 1 is a basic diagram of an ink-jet printer embodying the invention.

With reference to FIG. 1, a platen 31 supports the paper 32 on which the ink-jet printer, including a printing head 33, is to print. This head comprises a container 34 of insulating material closed by a plate 35 also of insulating material. In the plate 35 there is provided a nozzle 36 constituted by a bore of very small diameter, namely a few hundredths of a millimeter. This bore can be made by drilling the plate 35 with a laser beam which gives it a slightly conical pattern with a substantially rounded inner edge.

A quantity of electrically conducting liquid ink 37 is placed in the container 34. The ink 37 is constituted by pigmented particles disposed in a conducting liquid mixture. In the container 34 there is disposed a first electrode 38 connected to the negative pole of a D.C. voltage source 39, the positive pole of which is connected to a second electrode or counter-electrode 40. This is disposed between the nozzle 36 and the paper 32, and in particular is fixed on the plate 35, with one end disposed adjacent to the outer end of the nozzle 36. A pulse generator is arranged to be operated selectively in order to complete the connection between the voltage source 39 and the electrodes 38 and 40, to supply the printing pulses, as indicated schematically by contacts 41.

Obviously the voltage provided by the source 39 must be of suitable value with reference to the distance of the electrode 40 from the nozzle 36 and to the other electrical and physical characteristics of the ink 37, such that when the electrodes 38 and 40 are excited, there is a sudden increase in the ionisation of the space between the counter-electrode 40 and the meniscus 42 of the free surface of the ink, which normally forms inside the nozzle 36. When the level of ionisation reaches a sufficiently high value, the dielectric constituted by the air breaks down and a spark forms between the ink meniscus 42 and the counter-electrode 40. This spark induces a discharge of positive ions between the counter-electrode 40 and the meniscus 42, while a surge of negative ions is projected by the meniscus 42 towards the counter-electrode 40, in a like manner to that which happens in carbon lamps. The bombardment of the meniscus 42 by the positive ions originating from the counter-electrode 40 generates a state of mechanical agitation on the meniscus 42, sided by the partial evaporation of the ink 37 caused by the heat generated by the impact of the positive ions and by the Joule effect produced by the discharge, so that a large pressure increase takes place. The impact of this bombardment on the surface of the meniscus 42 creates a spray consisting of a large number of ink particles in the nozzle 36, regardless of whether the surface of the meniscus 42 is more or less fluid, plastic or dry. These particles become turbulent within the local high temperature and pressure environment and are expelled by the nozzle 36. They are thrown against the paper 32 guided at least partly by the length of the nozzle 36, substantially along the axis of the nozzle 36. In practice, a rose arrangement of microdroplets forms and these extend fairly uniformly on the paper 32 over a surface diameter of less than 0.1 mm, thus printing a dot. It has been found experimentally that the phenomenon occurs even when reversing the polarity of the two electrodes 38 and 40. This is because, although of smaller mass, the negative ions also manage to create on the liquid meniscus 42 the conditions necessary for expelling the ink particles 37, while the positive ions which strike the electrode 40 are unable to erode this electrode, given that it is constructed of a much more resistant material, as will be seen hereinafter.

More particularly, in the experiments carried out, inks were used having a density of between 1.01 and 1.1 relative to distilled water, a surface tension of between 30 and 50 dynes/cm and a conductivity of between 4 and 6 mmhos/cm. The inks tried contain from 3 to 5% of dye particles in a mixture containing mainly water and diethylene glycol, made conducting by an electrolytic salt, for example ethylenediaminotetracetic acid.

Figure 2:
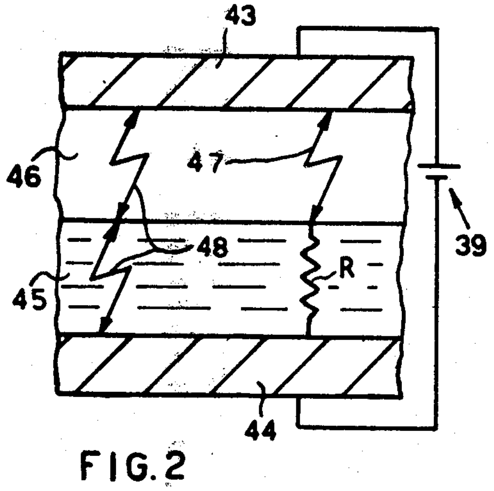
FIG. 2 is a diagram illustrating the operation of the printer.

The conductivity of such a mixture is much greater than air, so that a suitable voltage applied between two metal electrodes 43 and 44 (FIG. 2) separated by a layer of mixture 45 and a layer of air 46 induces a spark 47 in the air, which behaves as a dielectric, while the mixture 45 behaves as a conductor of resistance R. If the conductivity of the mixture 45 were less than or equal to air, the voltage between the two electrodes 43 and 44 would create a spark 48 which would propagate both through the air 46 and through the mixture 45. It has been found experimentally that if the mixture in the device 33 (FIG. 1) is of low conductivity, then notwithstanding the elevated temperature caused by the spark and thus the elevated pressure inside the nozzle 36, the ink jet does not form, thus confirming the essential action of the spark ions on the surface of the meniscus 42. It is therefore clear that the minimum conductivity of the ink 37 for printing by means of the device according to the invention is slightly greater than that of air under the humidity and ionisation conditions of the nozzle 36 during operation.

Confirmation of the combined action of the spark and pressure on the extraction of ink particles has been obtained by the following experiment. A lateral bore 49 indicated by broken lines in FIG. 1 was formed in the nozzle 36. On completing the connection between the voltage source 39 and electrodes 38 and 40 by means of the generator 41 as in the preceding case, it was found that the spark became generated in the same manner, but the ink jet was lost in the form of vapour which emerges weakly both from the nozzle 36 and from the lateral bore 49. This experiment also demonstrates that the ink ejection is not due to the electrical wind generated by a flow discharge phenomenon of the point conductor represented by the ink in the nozzle 36, because in such a case, printing would equally have to be able to take place in the presence of the lateral bore 49.

An essential condition for the correct operation of the printer is that the meniscus 42 forms always in contact with air in a substantially withdrawn position in the nozzle 36. Indeed, as later described, a meniscus withdrawn behind the inner end of the nozzle can be employed. Under dynamic conditions, the position varies with the surface voltage of the ink 37 and with its pressure in the nozzle 36, while under static conditions it fills the entire nozzle 36. If the container 34 is of limited capacity, the pressure in the nozzle 36 falls as the ink becomes consumed. In order to increase the quantity of ink 37 available to the nozzle 36, and thus the efficiency of the printer, and in order to maintain the pressure of the ink 37 constant in the nozzle 36, the printer is fitted with a reservoir 51 having a capacity much greater than that of the container 34. The reservoir 51 is connected to the container 34 by a hydraulic circuit comprising a feed tube 52, a discharge tube 53 and a pump 54 which keeps the ink continuously circulating through the container 34 under a substantially constant predetermined head h. This circulation not only favours dispersal of the heat produced by the sparks, but also causes the removal of any bubbles which form in the nozzle 36. These bubbles could hinder the return of the meniscus 42 to its rest position, and create an additional layer between the air and liquid ink 37, which would falsify the action of the spark.

The pump 54 can be of suction type and in the discharge tube 53 as indicated in FIG. 1 with the head h. The pump 54' can however also be of force type and be in the feed tube 52, as indicated by dashed lines in FIG. 1 with a head h'. In both cases, the head h or h' is negative and the meniscus assumes a concave form. The head h' is also independent of the level of the free ink surface in the reservoir 51. Obviously the head h or h' of the pump 54 or 54' must not be so high as to cause the meniscus 42 to leave the nozzle 36, so sucking in air from the outside.

The experiments carried out have demonstrated a certain improvement in printing in the presence of ink circulation. However, they have shown no appreciable difference in the printing result between one or other pump arrangement. In practice, a head of between 1 cm and 20 cm is sufficient. The device can also operate with a positive head which is obtained by placing the reservoir 51 above the container 34. In this case the meniscus 42 is convex.

Immediately after the impact of the spark, the meniscus 42 withdraws temporarily both because of the pressure formed in the nozzle 36 and because of the suction of the ink particles, to move for example to 42' (FIG. 1). It is essential that the meniscus 42' does not become disposed alternately inside and outside the nozzle 36 by the effect of this withdrawal, but remains either always inside or always outside the nozzle 36. For this purpose it has been found that the nozzle 36 must have a length of at least 0.2 mm. It must not exceed a length of 2 mm, in order to prevent it becoming filled with bubbles. An optimum situation for the ejection of the ink particles is attained if the spark is induced while the meniscus is in movement from the withdrawn position 42' to the extreme position 42, and before it has reached the extreme position, even though no appreciable differences in the printing result occur if the meniscus 42 is in its initial position.

With the aforesaid inks and dimensions of the nozzle 36 and its head in the hydraulic circuit, ejection frequencies for the ink 37 up to 20,000 Hz can easily be attained without the meniscus 42 withdrawing too far into the nozzle 36. With this frequency, in the case of $5\times7$ dot printing, a printing speed of 400 char/sec. is attained with a single nozzle 36.

Figure 3:
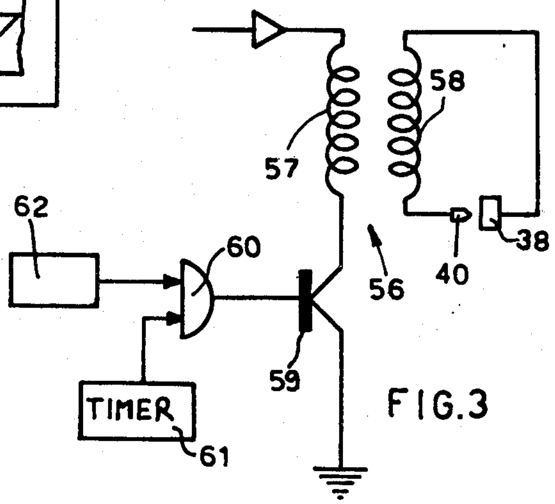
FIG. 3 is a circuit diagram showing the printer control circuit.

The voltage necessary for generating the spark between the electrodes 38 and 40 can be generated by a circuit constituted essentially by a transformer 56 (FIG. 3), the primary 57 of which is connected to a low voltage source, while the secondary 58 is connected to the two electrodes 38 and 40. The primary 57 is also connected to a transistor 59, the base of which is controlled by a gate 60 under the control of a timer 61 which gives the required ejection frequency. The relative movement speed of the paper 32 (FIG. 1) and nozzle 36 must be synchronised to this frequency. The gate 60 is also controlled by a logic signal provided by a character generating circuit 62. The transistor 59 is then controlled in such a manner as to generate the printing pulse in the secondary 58.

By way of example, the transistor 59 can be normally kept conductive. At the moment in which it is required to cause printing, it is blocked to create a more or less immediate stoppage of the current in the primary 57 (signal B in FIG. 4). By the effect of the induction, a voltage pulse is then generated in the secondary 58 (FIG. 3) which increases rapidly to a maximum, at which the spark is struck, after which the voltage reduces rapidly. The variation in this voltage is represented by the curve V in FIG. 4. In turn, the current between the electrodes follows the curve A, from which it can be seen that after the spark, the current becomes stabilised at an intermediate value before completely ceasing. The period during which the ejection of the ink 37 takes place is substantially that lying between the abscissae $t_1$ and $t_2$ in which the discharge voltage drop takes place.

By arranging the electrode 40 at a distance from the outer end of the nozzle 36 between 0.2 and 1 mm, it has been found that within the limits of the aforesaid parameters for the ink, the nozzle, the hydraulic circuit and the electrical circuit, it is sufficient to provide a maximum voltage of between 1000 and 3000 V, to which a maximum current of between 10 and 30 mA corresponds. The duration $t_2$-$t_1$ of the discharge, and consequently of the ejection, is between 5 and 15 μsec, so that at a frequency of 20,000 Hz, a time of between 45 and 35 μsec remains between the end of one ejection and the beginning of the next.

Figure 4:
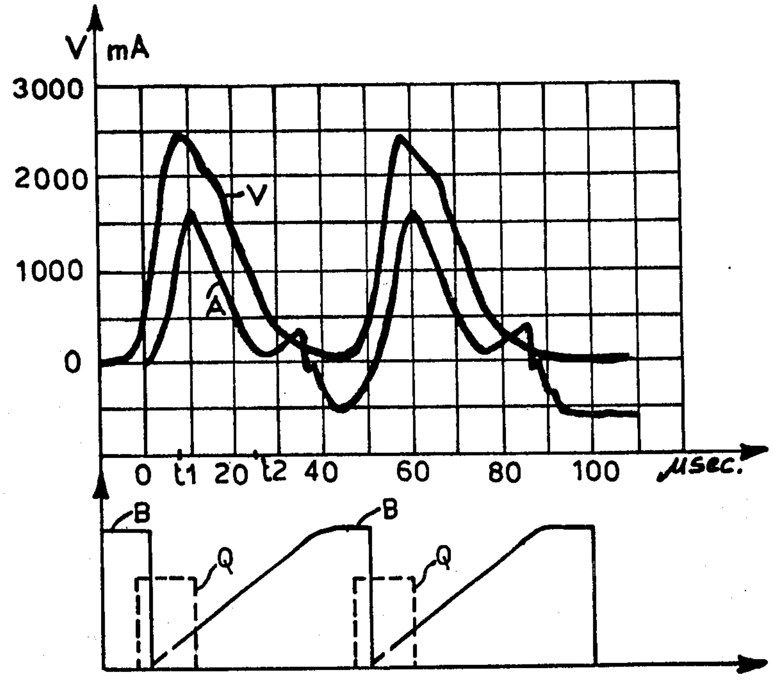
FIG. 4 is a diagram of the current and voltage between the electrodes.

The transistor 59 (FIG. 3) can obviously be controlled in such a manner as to be made conductive for a predetermined time, giving the primary 57 a square pulse of voltage Q (FIG. 4), for example having a duration of 2–3 μsec. In the secondary 58 (FIG. 3), the inductance of the circuit creates a voltage wave and current wave which vary substantially as shown in FIG. 4.

Figure 5:
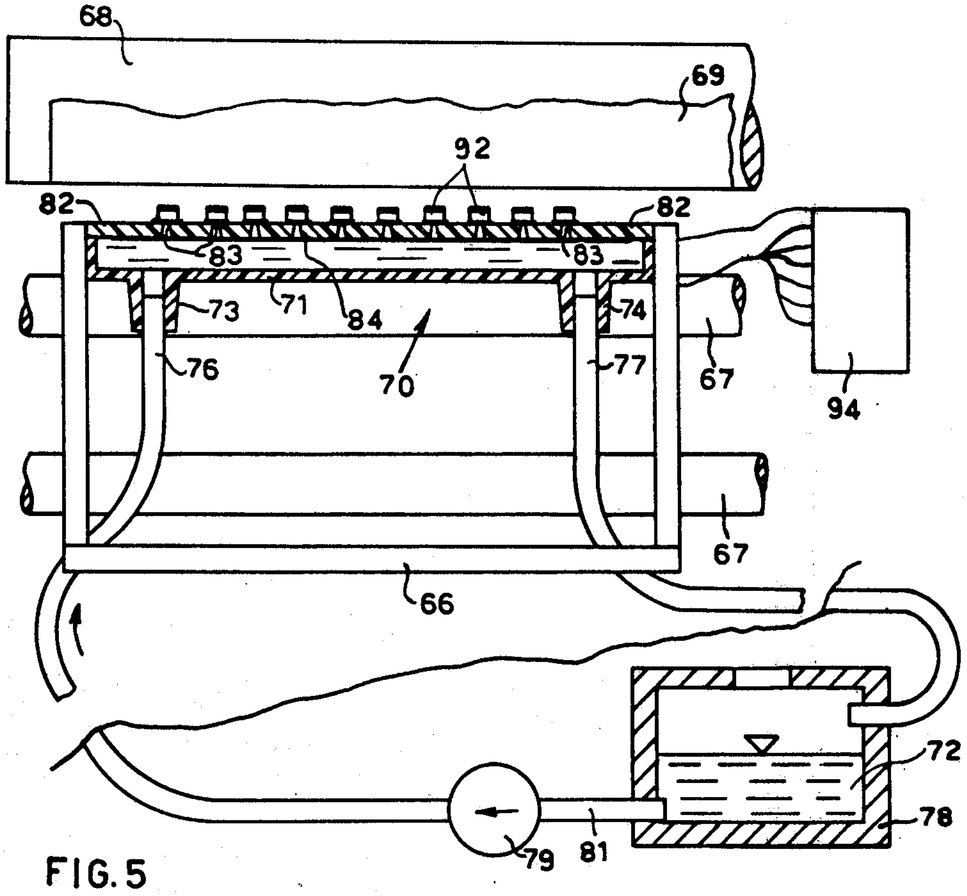
FIG. 5 is a diagrammatic plan view of a further embodiment of the invention.

One embodiment of the printer, for example for printing on a computer strip, comprises a carriage 66 (FIG. 5) traversing on two guides 67 parallel to a support platen 68 for the paper 69, this roller being transversely fixed. A printing head 70 is disposed on the carriage 66 and comprises a prismatic container 71 for the ink 72. The container 71 is of insulating material and is provided at its two ends with two unions 73 and 74, to which two tubes 76 and 77 for feeding and discharging the ink 72 are connected. On the fixed frame of the machine there is disposed an ink reservoir 78 to which the tube 77 leads, and a force pump 79 connected at one end to the feed tube 76 and at the other by a conduit 81 to the reservoir 78, shown in FIG. 5 turned through 90°.

The container 71 is closed at its rear by a plate 82 in which, as will be more apparent hereinafter, there is provided a set of ten nozzles 83 disposed in a row and equidistant for example by 5.08 mm, each nozzle 83 being provided for printing two characters. The plate 82 is also of insulating material, and carries at its front a printed circuit 84 in the form of a common conductor disposed inside the container 71. The plate 82 carries at its rear a printed circuit 86 in the form of a set of concentric rings 87, with the nozzles 83 connected by vertical conductors 88 to a like number of terminal lugs 89 (see FIGS. 7 and 8).

Figure 6:
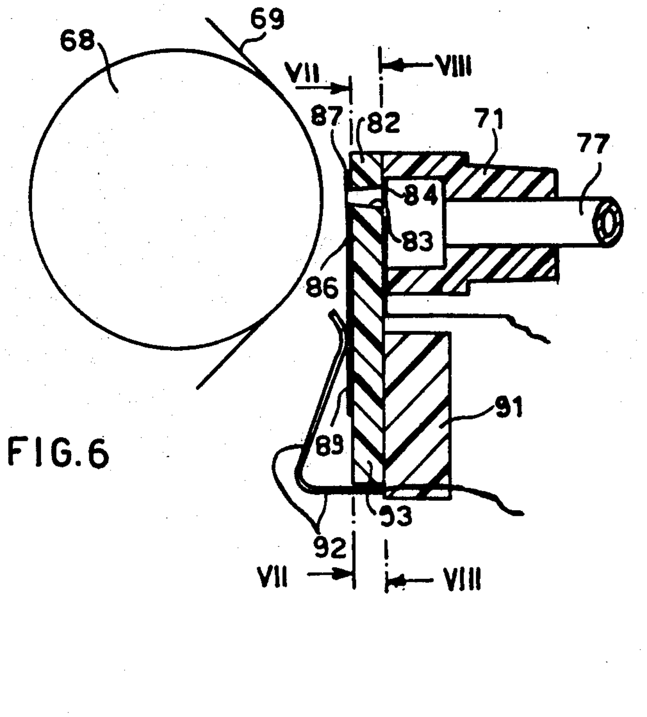
FIG. 6 is a cross-section through the printer of FIG. 5 to a larger scale.

A multiple connector 91 (FIG. 6), comprising a set of ten spring contacts 92, is inserted into a downward extension 93 of the plate 82 in such a manner as to keep each spring contact 92 in contact with the corresponding lug 89. The connector 91 is also connected to a control unit 94 comprising nine control circuits, for example of the type indicated in FIG. 3.

The carriage 66 (FIG. 5) travels with reciprocating motion for a useful stroke of 5.08 mm, while the platen 68 feeds the paper 69 stepwise. The control unit 94 (FIG. 5) is synchronized in accordance with the 5×7 dot matrix, so that printing can be carried out up to a speed of 200 lines/sec. The plate 82 (FIG. 9) is constituted by a 0.5 mm thick insulating layer of alumine or other refractory materials such as fosterite, steatite or glass, or of a photo-engravable glass ceramic material such as the materials known as Fotoform or Fotoceram of Messrs Corning Glass Works. By means of the silk-screen printing method, on one side of the layer 82 the common conductor 84 is deposited, and on the other side a first layer 96 of a metal resistant to erosion, including erosion at high voltages, such as nickel. This layer is then built up by electrolytic deposition of a second layer 97 of a non-oxidising, conducting metal of high melting point, such as platinum, in order that the edge of the layer 97 is at a distance of 0.2 , from the edge of the nozzle 36. Finally, the nozzles 83 are perforated by means of a laser, in order to attain a diameter at the outer end of the nozzle 83 of 0.05 mm.

Figure 9:
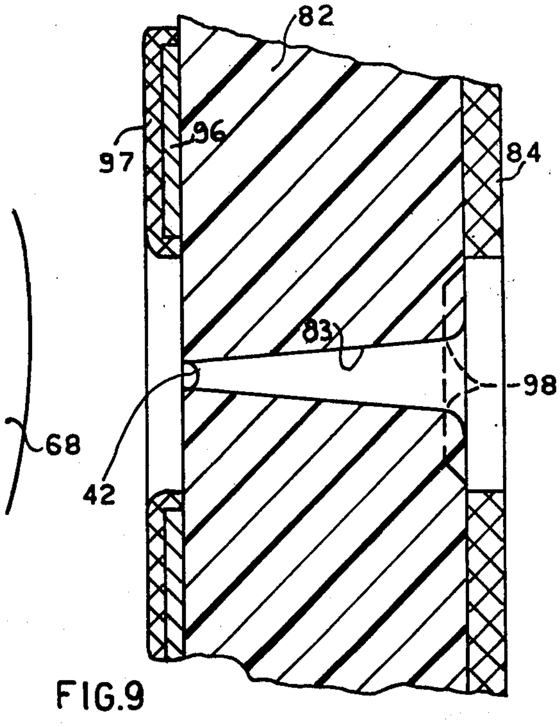
FIG. 9 is a section through a detail of FIG. 7 to a much larger scale.

The inner end of the nozzle 83 can also be made in the form of a sharp edge 98, indicated by dashed lines in FIG. 9, by drilling by means other than the laser beam, for example using a drill, or following the laser perforation by a grinding operation on the inner surface of the plate 82. The sharp edge 98 facilitates rupture of the vapour bubbles and hence vapour expulsion.

The carriage 66 (FIG. 5) is mounted so as to carry the nozzles 83 at a distance of between 0.1 and 5 mm from the paper 69. This distance can be adjusted to obtain optimum definition and sharpness of the mark. With a distance of 0.2 mm using the embodiment described, it has been found with the electron microscope that the ink particles have a speed of about 50 m/sec., and thus much greater than the traversing speed of the carriage 66. In order to write at 200 lines/sec. at 20,000 Hz while printing both on its outward and return stroke, the carriage 66 must in this respect travel at a speed of 3.5 m/sec. There is thus an obvious advantage over the known selective ink-jet printing devices in which the ink speed is of the same order of magnitude as the traversing speed (about 5 m/sec for piezoelectric control), so that the circular section jet tends to produce an oval mark with blurring at its ends. The advantage also remains over known continuous ink-jet printing devices, in which the ink speed is about three times that of the piezoelectric control, but is still only slightly greater than that of the traversing speed between the paper and nozzle.

Figure 10:
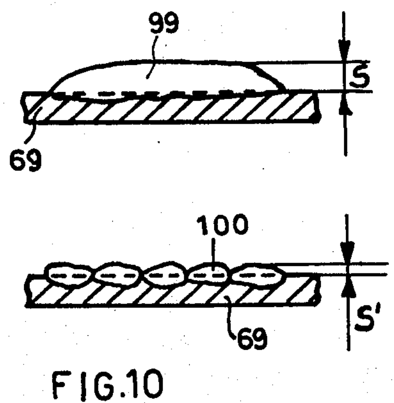
FIG. 10 is a diagram of the dots printed by a conventional ink-jet printer and by the printer of FIG. 5.

A further discovery made with the electronic microscope relates to the plurality of microdroplets emitted each time from a nozzle. It has been found that the diameter of these microdroplets lies between 5 and 10μ, against a diameter of 50–60μ in the case of droplets produced by piezoelectric control, so that an equal volume of ink emitted by the spark produces several hundreds of microdroplets, instead of a single droplet. In depositing on the paper, the piezoelectric droplet becomes arranged as indicated by 99 in FIG. 10, with poor penetration into the paper 67 and a maximum thickness S which requires a long time for drying, or even a source of heat or hot air. In contrast, with the spray generated by the discharge consequent on the spark, the individual microdroplets penetrate more into the paper, and extend fairly uniformly over the surface as indicated by 100 in FIG. 10, so presenting to the air a corrugated surface much greater than that of the dot 99 and with a maximum thickness S' which is less than the thickness S of the layer 99. It is therefore apparent that the dot produced by the spray due to the spark dries immediately and remains indelible. It has been found that the mark remains sharp, indelible and dry even on coated or translucent paper, such as tracing paper.

Figure 11:
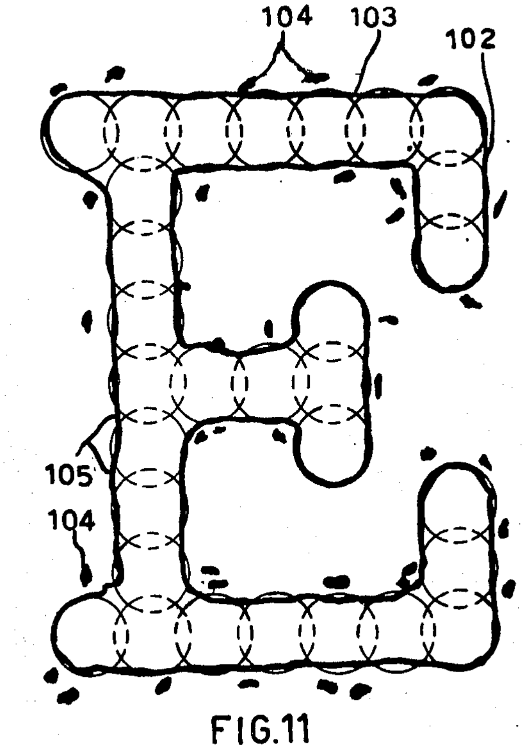
FIG. 11 is a diagram of a high definition character printed by the printer of FIG. 5.
Figure 7:
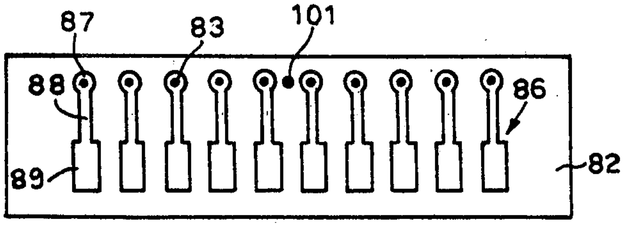
FIG. 7 is a front view of the printer on the line VII—VII of FIG. 6.
Figure 8:
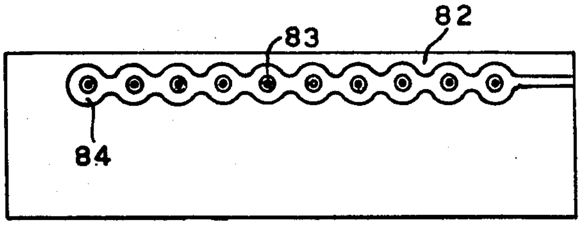
FIG. 8 is a section on the line VIII—VIII of FIG. 6.

For a high definition printing device, the carriage 66 can traverse along the entire line for series printing. The printing head 70 can be mounted rotatably on the carriage 66, for example about a central point 101 (FIG. 7). The rotation can be such as to be able to print with the various nozzles on different lines of a predetermined grid. For example, the inclination can be such as to cover half the height of the character with the ten nozzles, so that one character can be obtained with two passes of the head 70. Good resolution is obtained with a grid of 0.2 mm. This gives a character of height 2 mm, in that the space between two characters consists of 100 dots 102 (FIG. 11). With a single nozzle 83 of the type described, and with an operating frequency of 20,000 Hz, a printing speed is obtained of 200 char/sec, while with a 10 nozzle head, the speed is 2000 char/sec.

FIG. 11 shows a character, magnified 50 times, printed by the printing head 70 heretofore described and with a pitch of 0.2 mm. It can be seen that the edges of the character are perfectly defined. In FIG. 11, the dots 102 are indicated by broken lines, and give the theoretical profile of the character indicated by a continuous line. The effective profile of the character is indicated at 103. It can be seen that erratic ink particles 104 and parts 105 of the continuous profile which depart from the theoretical profile are relatively few, and of small extent.

Obviously, the number and spacing of nozzles 83 can be varied according to the type of application for which the head 70 is designed. Furthermore, several heads 70 can be provided in parallel, each of which is designed to print a single line portion. In particular, for a printer of a facsimile transmission apparatus, the row of nozzles can be disposed vertically so that the various nozzles 83 simultaneously scan different lines. Obviously in this case, the support for the paper 69 must be flat instead of cylindrical.

Figure 12:
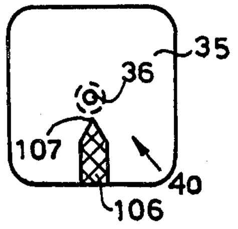
FIGS. 12 and 13 illustrate two modifications of the printing device showing different electrode forms.
Figure 13:
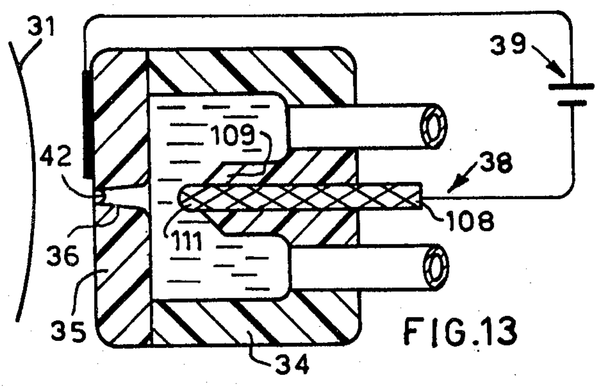

The relative positions of the nozzle 36, of the container 34 and of the electrodes 38 and 40, and their form, can be varied in different ways. Likewise, the circulation of the ink 37 can take place by means other than by the suction or force pump illustrated in FIG. 1. In particular, the counter-electrode 40 adjacent the nozzle 36 can be constituted by a substantially rectangular plate 106 (FIG. 12) having a point 107 disposed for example below the edge of the nozzle 36. The electrode 38 can be constituted by rod 108 (FIG. 13) embedded in an insulating baffle 109 in the container 34, and having an end 111 immersed in the ink 37.

Figure 14:
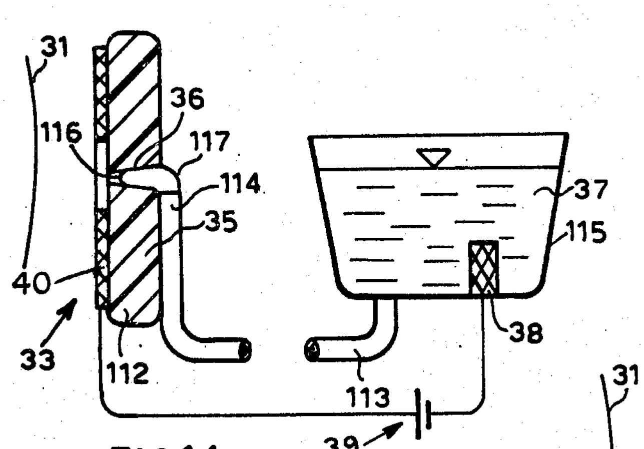
FIGS. 14 and 15 illustrate two modifications of a further embodiment of the printing device with natural ink circulation.

In the embodiment described heretofore, it has been assumed that the ink is circulated through the container by a pump. In the embodiment of FIG. 14, the printing head 33 is constituted simply by a plate 112 provided with the counter-electrode 40 and nozzle 36. The end of a capillary tube 113, the free edge 114 of which is aligned with the lower inner edge of the nozzle 36, is fixed to the plate 112. The tube 113 is connected to a reservoir 115 fixed on the machine frame. The electrode 38 is immersed in the ink 37 of the reservoir 115, in which the ink is kept at a level slightly greater than the tip 114 of the tube 113. The ink 37 thus rises by capillary action as far as the tip 114, and because of its surface tension forms a convex meniscus 116 inside the end of the nozzle 36 and a convex meniscus 117 between the tip 114 and the upper inner edge of the nozzle 113. In this manner, an ink droplet is created in a substantially constant position, ready to receive the impact of the spark. This modification also has the advantage of easily expelling into the air any possible vapour bubbles which form because of the spark.

Figure 16:
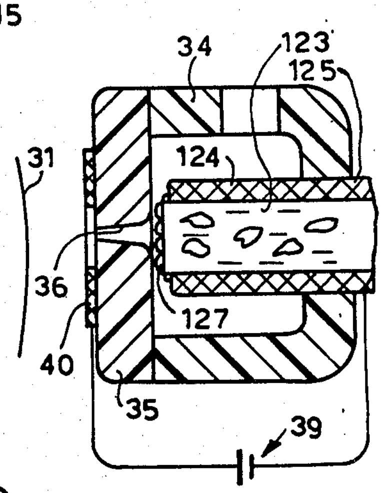
FIGS. 16–19 show four modifications of a further embodiment of the printing device, in which the position of the ink meniscus in the nozzle is controlled mechanically.
Figure 15:
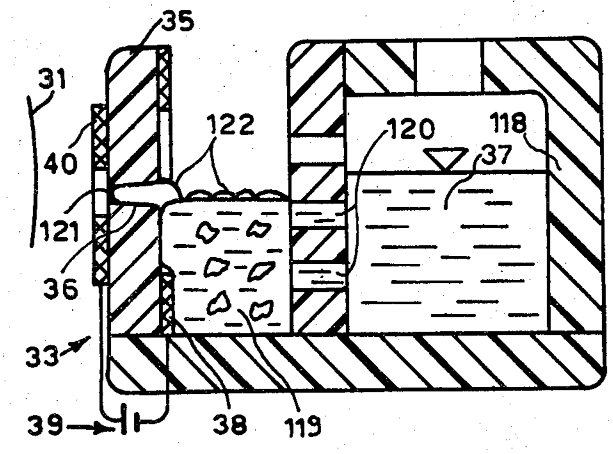

The modification of FIG. 15 is equivalent to that of FIG. 14 from the meniscus formation aspect. In the modification of FIG. 15, the reservoir 118 is carried by the same carriage as the head 33, while the ink 37 is brought to the nozzle 36 by a layer of porous material 119 in communication with the reservoir 118 by way of one or more ducts 120. The layer 119 reaches the lower edge of the nozzle 36, so that the ink forms a meniscus 121 in the nozzle 36 and a series of menisci 122 on the free surface of the layer 119. The electrode 38 is disposed on the inner surface of the plate 35. In the modification of FIG. 16, the porous material is in the form of a rod 123 carried inside a cylindrical metal electrode 124. This is connected by a flexible tube 125 to an ink reservoir fixed on the printer. The end surface of the rod 123 is in contact with air, and is covered by a series of menisci 127 to which the ion discharge reaches, while the vapour bubbles escape easily into the air.

Figure 17:
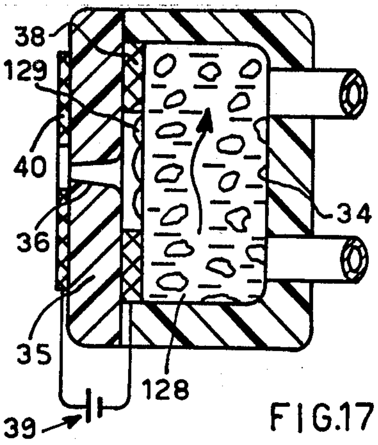
Figure 18:
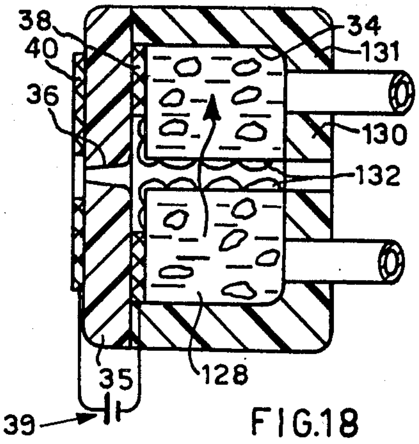

In a further embodiment of the invention, in order to keep the nozzle free from the meniscus, a porous layer is used as a conduit for the ink in the hydraulic circuit comprising a pump, not shown on the drawings. In the diagram of FIG. 17 and the subsequent figures, the ink circulation induced by the pump is indicated by a wavy arrow. In the modification of FIG. 17, the porous layer is kept spaced from the inner surface of the plate 35 at the nozzle 36, by virtue of the thickness of the electrode 38, which is sufficiently spaced apart from the inner edge of the nozzle 36. On the free surface of the porous layer there forms a plurality of convex menisci 129, on which the spark strikes because of the minimum distance of the counter-electrode 40 from the electrode 38. The sufficiently large free surface of the porous layer 128 allows absorption of any vapour bubbles. In the modification of FIG. 18, a bore 130 in the rear wall 131 of the head 33 and in the porous layer 128 facilitate evacuation of the vapour bubbles into the air.

Figure 19:
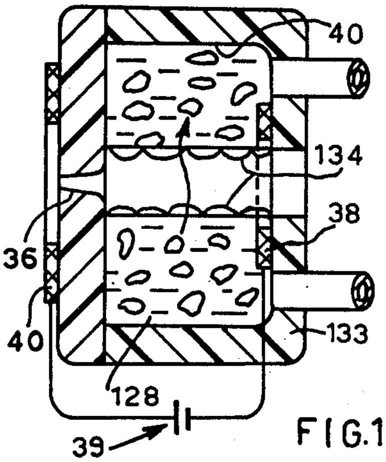

In the modification of FIG. 19, the sheet metal electrode 38 is disposed between the porous layer 128 and the rear wall 133, while the bore 134 in the porous layer, and consequently also in the electrode 38 and wall 133, has a diameter such as to eliminate the ring between the layer 128 and inner edge of the nozzle 36, so that that surface of the layer 128 exposed to the discharge is considerably increased in size, and is constituted by the inner surface of the bore 134. Obviously the modifications of FIGS. 17–19 can also operate if the porous material is dispensed with, and the ink allowed to flow freely into the interspace.

Figure 20:
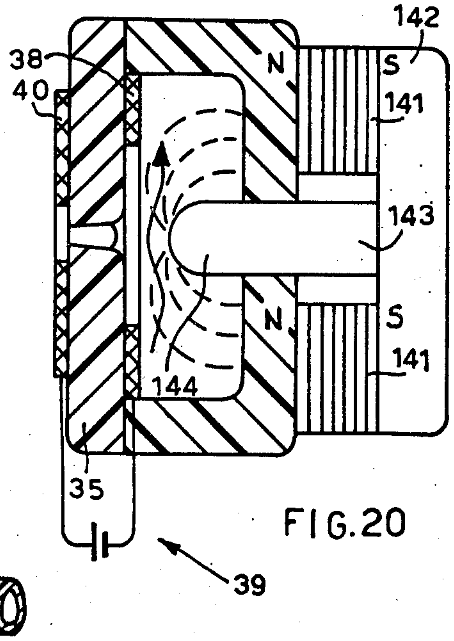
FIGS. 20 and 21 illustrate two modifications of a further embodiment of the printing device, in which magnetic ink is used.

According to a further embodiment, a magnetic ink is used and is immersed in a magnetic field, the lines of force of which hold the ink particles at the inlet to the nozzle 36. Thus, in the modification of FIG. 20, the magnetic field is obtained by an annular permanent magnet 141 co-operating with a keeper 142 on which there is fixed a cylinder 143 passing within the magnet 141 and having a rounded end 144. The lines of force of the magnetic circuit lie as indicated on the figure by broken lines, so that although the magnetic ink particles are subjected to the circulation caused by the pump, they lie to the sides of the end 144 of the cylinder 143, and leave the nozzle 36 free for guiding the ink particles ejected by the spark.

Figure 21:
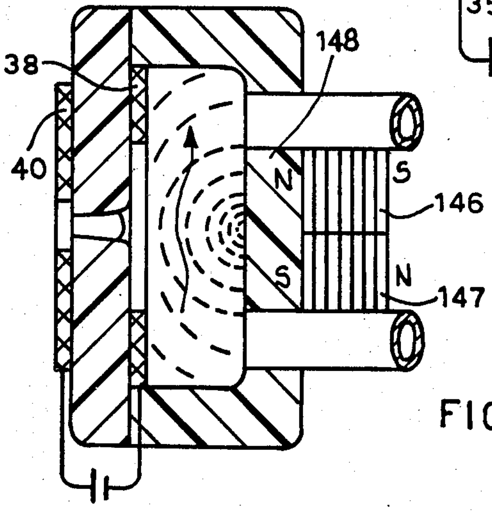

In the modification of FIG. 21, two permanent magnets 146 and 147 are provided, positioned in a reverse direction. In the magnetic ink stream, the lines of force thus assume the pattern indicated by dashed lines in FIG. 21, and are more dense towards the wall 148. The ink particles become disposed in such a manner as to be better guided by the nozzle 36. Obviously in the two modifications of FIGS. 20 and 21, the magnets 141, 146 and 147 can be constituted by magnetic rubber instead of magnetic ferrous material.

Figure 22:
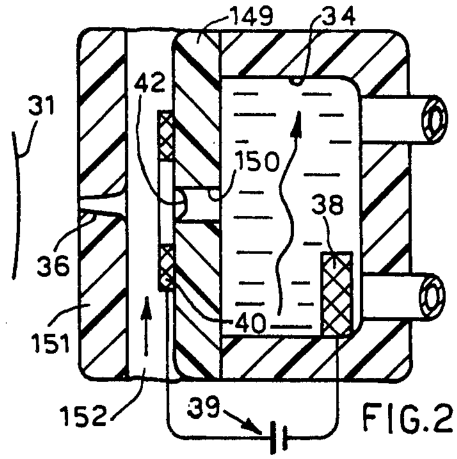
FIGS. 22–24 illustrate three modifications of a further embodiment of the printing device, in which the meniscus position is kept outside the nozzle.

In a further embodiment of the invention, an air layer is provided between the nozzle 36 and the ink to ensure separation between the ink meniscus and the nozzle. In particular, in the modification of FIG. 22, the ink container 34 is closed by a plate 149 carrying the counter-electrode 40 about a bore 150 in which the meniscus 42 forms. A second plate 151 is disposed at a certain distance from the plate 149, to which it is connected for example laterally, in order to form an interspace 152 which allows vertical air circulation. The actual ink guiding nozzle 36 is carried by a plate 151, so that it serves only as a guide for the ink particles projected into its interior. In contrast, the plate 151 blocks any microscopic ink particles which are not expelled parallel to the axis of the bore 150. The interspace also ensures evacuation of any vapour bubbles.

Figure 23:
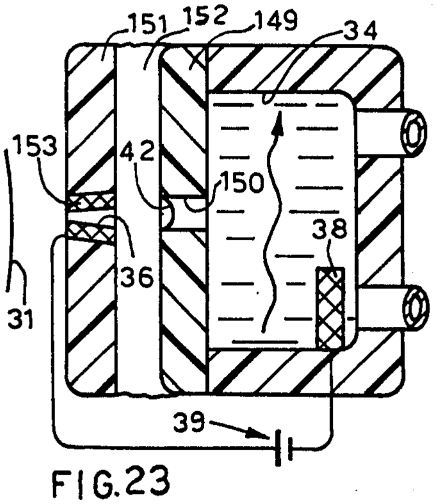
Figure 24:
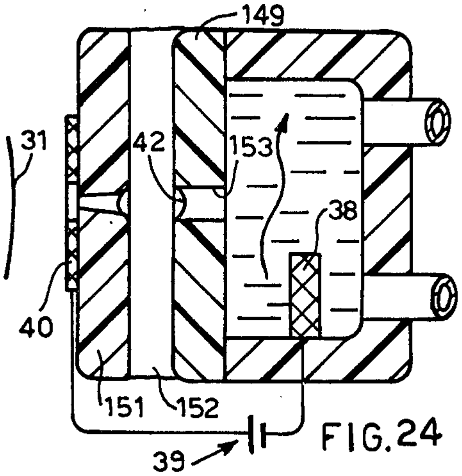

In the modification of FIG. 23, the counter-electrode is constituted by a metallisation layer 153 on a bore in the second plate 151, so that the nozzle 36 is formed by the metallisation layer 153. In the embodiment of FIG. 24, the counter-electrode 40 is disposed on the outer wall of the second plate 151.

Figure 25:
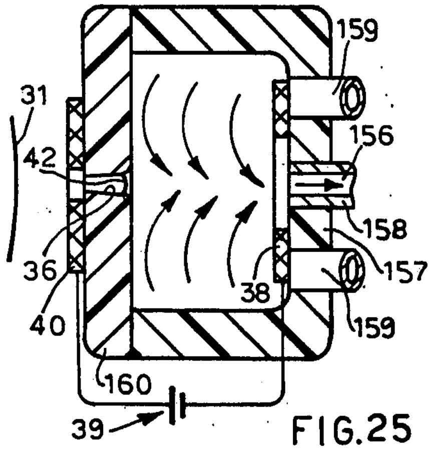
FIGS. 25–27 illustrate three modifications of a further embodiment of the printing device, in which the ink circulation takes place through a channel concentric to the nozzle.

In a further embodiment of the invention, the ink is circulated through a channel concentric with the nozzle. In the modification of FIG. 25, the ink is drawn through a bore 156 in the rear wall 157 connected by a flexible tube 158 to the pump. The ink is fed through a pair of conduits 159 disposed above and below the nozzle 36. The electrode 38 is fixed to the wall 157, while the counter-electrode 40 is fixed to the front plate 160. It is apparent that the ink stream causes a withdrawal of the meniscus 42 from the nozzle 36 and a reduction in the ink pressure at the nozzle 36.

Figure 26:
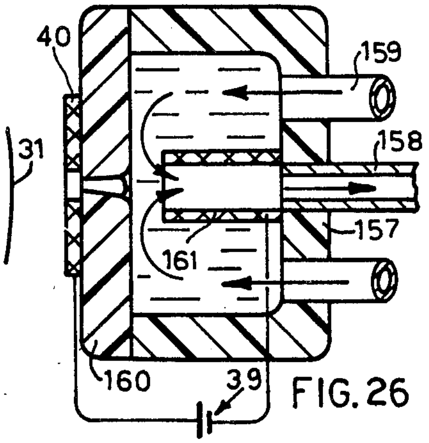
Figure 27:
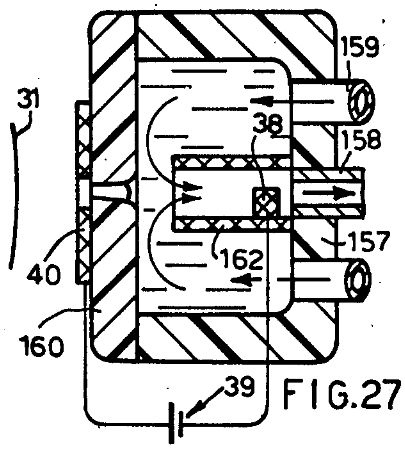

In the modifications of FIGS. 26 and 27, the central bore is provided by a rigid tube 161, 162 respectively. The tube 161 is of metal and acts as an electrode. The tube 162 is insulating, and in its interior it carries the electrode 38. Obviously the direction of the ink stream in the three modifications of FIGS. 25, 26 and 27 can be reversed without any appreciable change in the result of the ink jet.

Figure 28:
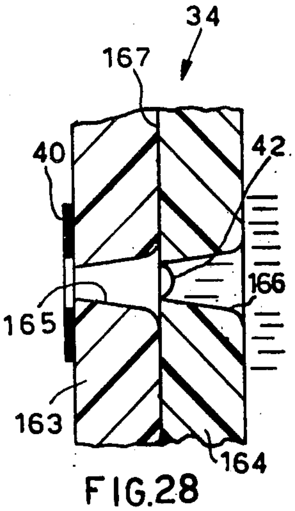
FIGS. 28 and 29 illustrate two modifications of the printing device, indicating different nozzle forms.

In a further embodiment of the invention, the nozzle is made in two portions to constitute an interruption for the physical or geometrical characteristics of its inner surface. In the modification of FIG. 28, the front wall of the container 34 is formed from two equal plates 163 and 164 bored individually with the laser and then welded. In this manner, the two bores 165 and 166 form an interruption at the contact plane 167 between the plates, so that the bore 165 acts as a guide nozzle and is never invaded by the ink meniscus 42.

Figure 29:
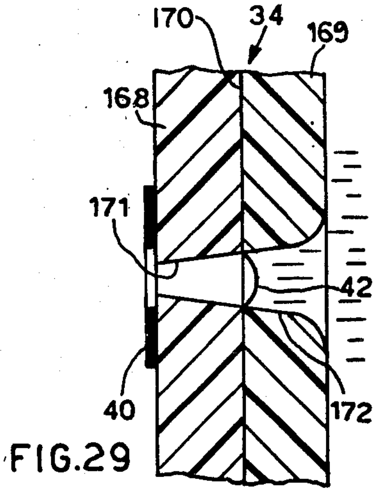

In the modification of FIG. 29, the two plates 168 and 169 are of two different materials, and in particular the material of the plate 169 is more wettable by the ink than the material of the plate 168. The two plates 168 and 169 are firstly welded together and then bored together. Again in this case, a discontinuity forms at the separation plane 170 between the two plates in the nozzle surface, which stops the meniscus and does not allow it to pass beyond this plane, so that that part of the nozzle constituted by the bore 171 in the plate 168 serves only for guiding the ink particles leaving the bore 172 of the plate 169. Various other modifications can be made to the described printing device without leaving the scope of the invention as claimed. For example, the ink can be kept under agitation in the container 34 by means other than the pump, such as a ball or a microsucker disposed behind the nozzle and moving by the effect of acceleration or of a magnetic field. In the case of several nozzles in parallel, the ball can be replaced by a cylindrical or grooved bar common to all the nozzles. The nozzle 36 can be branched with respect to the ball or bar. Finally, evacuation of the vapour bubbles can be facilitated by simply mounting a high frequency vibrator on the head.

We claim:

1. An ink-jet printing device in which printing is effected by inducing the selective emission from a nozzle of particles of liquid ink, said ink being electrically conductive, a container made of an electrically insulating material for containing said ink, a nozzle provided on said container having a diameter less than 0.2 mm and a length of between 0.2 and 0.5 mm, an electrode inside said container disposed to be in electric contact with said ink, a counter-electrode disposed adjacent to the nozzle on the outer surface of said container, and electrical means selectively operable to excite the electrode and counter-electrode by voltage pulses between 1000 and 3000 V so as to generate, between the meniscus of the ink at the nozzle and the counter-electrode, an agitation condition such as to cause the expulsion of a plurality of ink particles through the nozzle.

2. A device as claimed in claim 1, wherein the agitation condition is generated by the discharge of ions produced by the voltage from the counter-electrode to the meniscus and by the heat produced therewith.

3. A device according to claim 1, wherein said ink is held with a free surface meniscus at a predetermined distance from the outer end of the nozzle, said voltage and said distance being so selected as to generate a spark between the counter-electrode and the meniscus.

4. A device as claimed in claim 2, wherein the ink is contained in a layer of porous material in the container.

5. A device as claimed in claim 1, wherein the ink contains from 3 to 5 of coloured particles in a mixture containing diethylene glycol and an electrolytic salt arranged to give it a conductivity of between 4 and 6 mmhos/cm.

6. A device as claimed in claim 5, wherein the ink has a relative density of between 1.01 and 1.1 and a surface tension of between 30 and 50 dynes/cm.

7. An ink-jet printing device in which printing is effected by including the selective emission from a nozzle of particles of liquid ink, said ink being electrically conductive, a container made of an electrically insulating material for conducting said ink, a nozzle provided on said container having a diameter less than 0.2 mm and a length of between 0.2 and 0.5 mm, an electrode inside said container disposed to be in electric contact with said ink, a counter-electrode disposed adjacent to the nozzle on the outer surface of said container, means for holding said ink under such a pressure as to form a free surface meniscus inside the nozzle, and electrical means selectively operable to excite the electrode and counter-electrode by voltage pulses between 1000 and 3000 V for a time between 10 and 40 μsec so as to generate, between the meniscus of the ink at the nozzle and the counter-electrode, an agitation condition such as to cause the expulsion of a plurality of ink particles through the nozzle.

8. A device as claimed in claim 7, wherein the ink is kept in circulation at the nozzle by a hydraulic circuit comprising a pump connected between the container and an ink reservoir having a capacity greater than that of the container.

9. A device as claimed in claim 8, wherein the electrode is formed of a hollow bar which also constitutes one of the conduits of the hydraulic circuit.

10. A device as claimed in claim 7, wherein the ink is fed from a reservoir as far as the nozzle mouth by capillary action.

11. A device as claimed in claim 10, wherein the capillary action is obtained by a capillary tube, the free end of which is adjacent to the lower edge of the nozzle.

12. A device as claimed in claim 10, wherein the capillary action is obtained by a layer of porous material, the free end of which is adjacent to the nozzle edge.

13. A printing head as claimed in claim 7, wherein said nozzle has a slightly conical inner surface produced by a laser beam and the electrode and counter-electrode are carried by the container.

14. A printing head as claimed in claim 13, wherein the inner end of the nozzle is made sharp-edged in order to facilitate rupture of vapour bubbles.

15. A printing head as claimed in claim 7, wherein the counter-electrode is formed of a metallized layer in the inner surface of the nozzle.

16. A printing head according to claim 7, wherein the nozzle is formed in an insulating plate closing the container.

17. A printing head as claimed in claim 16, wherein the counter-electrode is printed on the plate in the form of an element terminating in a point adjacent to the nozzle end.

18. A printing head as claimed in claim 17, wherein the electrode is printed on the other surface of the plate.

19. A printing head as claimed in claim 17, wherein the electrode is printed on a second wall of the container.

20. A printing head as claimed in claim 16, wherein the counter-electrode is printed on the plate in the form of a ring about the nozzle end.

21. A printing head as claimed in claim 17, wherein the counter-electrode is disposed at a distance of between 0.02 and 2 mm from the nozzle edge.

22. A printing head as claimed in claim 7, wherein the nozzle has a diameter of between 0.05 and 0.2 mm.

23. A printing head as claimed in claim 7, wherein the electrode is constituted by a bar immersed in the ink.

24. A printing head as claimed in claim 23, wherein the bar is partly embedded is an insulating baffle.

25. A printing head as claimed in claim 23, wherein the bar is internally hollow and is coaxial to the nozzle.

26. An ink-jet printing device in which printing is effected by inducing the selective emission from a nozzle of particles of liquid ink, said ink being electrically conductive, a container made of an electrically insulating material for containing said ink, a nozzle provided on said container having a diameter less than 0.2 mm and a length of between 0.2 and 0.5 mm, an electrode inside said container disposed to be in electric contact with said ink, a counter-electrode disposed adjacent to the nozzle on the outer surface of said container, means for holding said ink with a free surface meniscus at a predetermined distance from the outer end of the nozzle, and electrical means selectively operable to excite the electrode and counter-electrode by voltage pulses between 1000 and 3000 V for a time between 10 and 40 μsec, so as to generate, between the meniscus of the ink at the nozzle and the counter-electrode, an agitation condition such as to cause the expulsion of a plurality of ink particles through the nozzle.

27. A device as claimed in claims 26, wherein said holding means are arranged to keep the meniscus of the free surface of the ink substantially outside the nozzle.

28. A device as claimed in claim 27, wherein the ink is contained in a layer of porous material, and said nozzle is located in an insulating plate the outer surface of which carries said counter-electrode, said meniscus keeping means comprising a space between the porous material and the inner surface of the nozzle plate.

29. A device as claimed in claim 28, wherein the space is costituted by a bore in the porous material coaxial to the nozzle, and in which air circulates freely.

30. A device as claimed in claim 29, wherein the bore is aligned with a bore in the ink container.

31. A device as claimed in claim 26, wherein the said meniscus keeping means comprises a second plate containing a bore aligned with the nozzle.

32. A device as claimed in claim 31, wherein two plates are of the same insulating material, and are bored independently of each other and are mounted in mutual contact in order to generate a discontinuity in the nozzle surface.

33. A device as claimed in claim 31, wherein the two plates have a different degree of wettability by the ink, and are firstly cemented together and then bored.

34. A device as claimed in claim 31, wherein the plates are mounted at a predetermined distance apart in order to form an interspace in which air circulates.

35. A device as claimed in claim 34, wherein the counter-electrode is printed on the inner plate.

36. A device as claimed in claim 26, wherein the ink is of magnetic type, and the said meniscus keeping means comprise magnet means disposed behind the container and arranged to thin out the ink at the mouth of the nozzle.

37. A device as claimed in claim 36, wherein the magnet means comprise a permanent magnet of anular shape coaxial with the nozzle and a keeper with a cylindrical end which passes into the magnet bore and has a portion immersed in the ink.

38. A device as claimed in claim 36, wherein the magnet means compise a pair of magnet positioned in opposite directions and disposed symmetrically about the nozzle axis.

39. An ink jet printing device in which printing is effected by inducing the selective emission from a nozzle of particles of liquid ink, said ink being electrically conductive, a nozzle, means for mounting a print support at a distance comprised between 0.1 and 5 mm from the outer end of said nozzle, a container made of an electrically insulating material for containing said ink, said nozzle being provided on said container and having a diameter less than 0.2 mm, an electrode inside said container disposed to be in electric contact with said ink, a counter-electrode disposed adjacent to the nozzle on the outer surface of said container, and electrical means selectively operable to excite the electrode and counter-electrode by voltage pulses between 1000 and 3000 V for a time between 10 and 40 μsec, so as to generate, between the meniscus of the ink at the nozzle and the counter-electrode, an agitation condition such as to cause the expulsion of a plurality of ink particles through the nozzle.

40. A device according to claim 39, wherein the ink is kept in circulation at the nozzle by a hydraulic circuit comprising a pump connected between the container and an ink reservoir having a capacity greater than that of the container.

41. A device as claimed in claim 40, comprising a plurality of nozzles disposed at a constant distance apart on a single printing head, the hydraulic circuit being disposed between a container common to the nozzles, and the reservoir.

42. A device as claimed in claim 41, wherein the head is mounted on a transversely movable carriage, the pump and reservoir being fixed on to the machine frame.

43. A device as claimed in claim 42, wherein the nozzles are disposed in a row which is variably inclinable in order to simulaneously include various lines of a printing grid.

44. A device as claimed in claim 43, wherein the grid has a pitch comprised between 0.1 and 0.2 mm in order to print high definition characters.

45. A method of effecting ink-jet printing, wherein a container having a capillary nozzle with a diameter less than 0.2 mm is filled with an electrically conductive liquid ink comprising the steps of forming a meniscus inside the nozzle and effecting a spark discharge in air between the meniscus of the liquid and a counter-electrode located adjacent said nozzle on the external surface of said container, without dielectric breakdown of the ink, the discharge occurring through the nozzle in or adjacent to the inner end of which the meniscus lies, so as to expel ink through the nozzle as a plurality of fine particles substantially parallel to said nozzle.

* * * * *